United States Patent
Millington et al.

(10) Patent No.: US 6,836,725 B2
(45) Date of Patent: Dec. 28, 2004

(54) VEHICLE NAVIGATION SYSTEM WITH OFF-ROAD NAVIGATION

(75) Inventors: Jeffrey Alan Millington, Rochester Hills, MI (US); Chandiran Palanisamy, Rochester Hills, MI (US); Rhonda Marie Paprocki, Macomb, MI (US); Anthony Albert Slominski, Harrison Township, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 12 days.

(21) Appl. No.: 10/236,350

(22) Filed: Sep. 6, 2002

(65) Prior Publication Data

US 2003/0060971 A1 Mar. 27, 2003

Related U.S. Application Data

(60) Provisional application No. 60/325,300, filed on Sep. 27, 2001.

(51) Int. Cl.[7] ............................................. G06F 21/00
(52) U.S. Cl. ....................................... 701/206; 701/206
(58) Field of Search ................................. 701/200, 206, 701/25; 340/988, 995.1, 995.14

(56) References Cited

U.S. PATENT DOCUMENTS

| | | |
|---|---|---|
| 4,388,608 A | 6/1983 | Bernard |
| 5,435,790 A | 7/1995 | Kota et al. |
| 5,471,205 A | 11/1995 | Izawa |
| 5,802,492 A | 9/1998 | DeLorme et al. |
| 5,948,040 A | 9/1999 | DeLorme et al. |
| 5,955,973 A | 9/1999 | Anderson |
| 6,115,669 A * | 9/2000 | Watanabe et al. ........... 701/209 |

FOREIGN PATENT DOCUMENTS

JP   9-257496   10/1997

* cited by examiner

Primary Examiner—Yonel Beaulieu
(74) Attorney, Agent, or Firm—Lowe Hauptman Gilman & Berner LLP

(57) ABSTRACT

A method and apparatus of utilizing waypoints for a vehicle is provided. A first waypoint relating to a first vehicle position is added to a second waypoint relating to a second vehicle position. The waypoints are saved as a route. Waypoint information relating to the waypoints and route information relating to the route may be manipulated. The method also includes displaying at least a portion of the route on a display screen and indicating a desired direction of vehicle travel from a current vehicle location to one of the waypoints. According to the present invention, the drive may be alerted when the vehicle has come within a particular distance of the waypoint or if the vehicle has veered from the route by a particular distance.

13 Claims, 6 Drawing Sheets

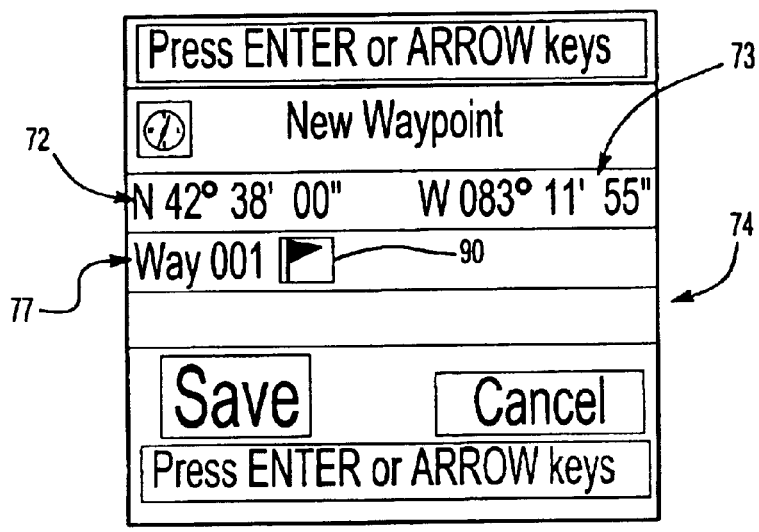
Fig-6
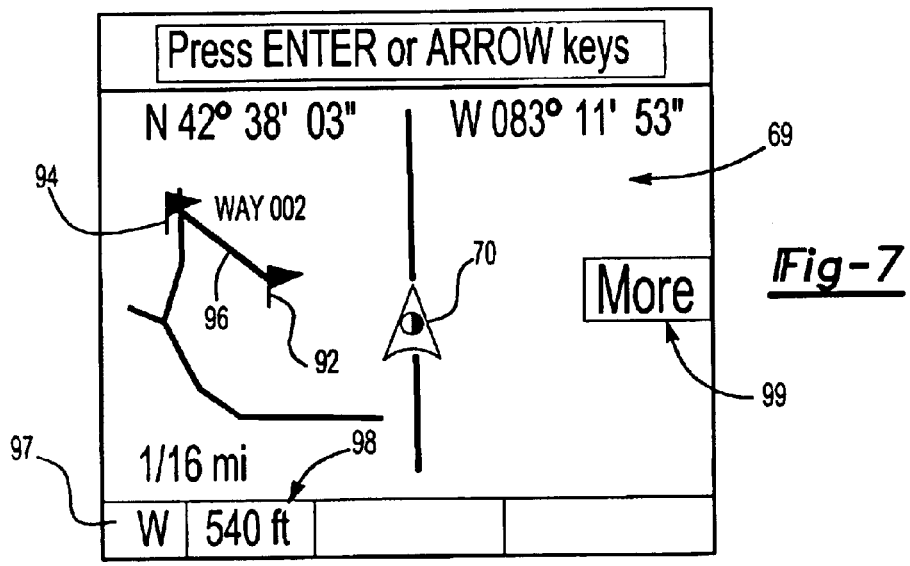
Fig-7
Fig-8

VEHICLE NAVIGATION SYSTEM WITH OFF-ROAD NAVIGATION

RELATED APPLICATIONS

This application claims priority to U.S. Provisional application Ser. No. 60/325,300 filed on Sep. 27, 2001.

BACKGROUND OF THE INVENTION

This invention relates to vehicle navigation systems and, more specifically, to map images appearing on a navigation system video screen of a display device.

Vehicle navigation systems typically include a display device with a video display that provides a graphical interface for the user. A main function of the video display is to depict the desired map area and route on which the user's vehicle is travelling. For convenience to the driver, several navigational modes may be provided. For example, an on-highway guidance mode may be provided in which directional arrows, highlighted routes, and/or voice instructions are given to the driver to guide the driver to a preselected destination.

An off-highway navigational mode has been provided to drivers hen traveling off of the road network provided by the storage device or other media. Once the vehicle is driven to a location without any nearby roads or other reference points it becomes more difficult to convey directions to the driver on how to get to the next destination. To this end, waypoints have been used, which represent a location such as latitude and longitude. The waypoints may be linked together to form a route by which the navigation system may direct the driver to follow. However, even with the use of waypoints and defined routes, providing direction to the driver may result in driver confusion. Therefore, what is needed is a navigation system that clearly conveys directions to a waypoint.

Depending upon the route, directing a driver from one waypoint directly to the next may be an inefficient manner in which to travel along a route. For example, a route which has sharp turn from one waypoint to the next will require the driver to arrive at the waypoint and then turn around and travel in a similar direction to reach the next waypoint. Therefore, what is needed is a navigation system that more efficiently guides a driver along a route.

SUMMARY OF THE INVENTION AND ADVANTAGES

The present invention provides a method of utilizing waypoints for a vehicle including the steps of adding a first waypoint relating to a first vehicle position and adding a second waypoint relating to a second vehicle position. The waypoints are saved as a route. Waypoint information relating to the waypoints and route information relating to the route may be manipulated. The method also includes displaying at least a portion of the route on a display screen and indicating a desired direction of vehicle travel from a current vehicle location to one of the waypoints. According to the present invention, the driver may be alerted when the vehicle has come within a particular distance of the waypoint or if the vehicle has veered from the route by a particular distance.

The present invention also includes an apparatus for a navigation system for providing waypoints. At least one position determining device provides a vehicle location signal. A database having a map includes a waypoint. A processor is interconnected to at least one positioning device and the database for determining the location of the vehicle relative to the map. A video display is connected to the processor for displaying a directional screen. A directional indicator indicates a desired direction of vehicle travel from the location of the vehicle to the waypoint with the processor displaying the indicator on the video display.

Accordingly, the above invention provides a navigation system that more efficiently guides a driver along a route.

BRIEF DESCRIPTION OF THE DRAWINGS

Other advantages of the present invention can be understood by reference to the following detailed description when considered in connection with the accompanying drawings wherein:

FIG. 6 is a video display of the display unit depicting a waypoint entry screen;

FIG. 7 is a video display of the display unit depicting a map area with waypoints;

FIG. 8 is a video display of the display unit depicting a first directional screen;

DETAILED DESCRIPTION OF THE PREFERRED EMBODIMENT

Figure 1:
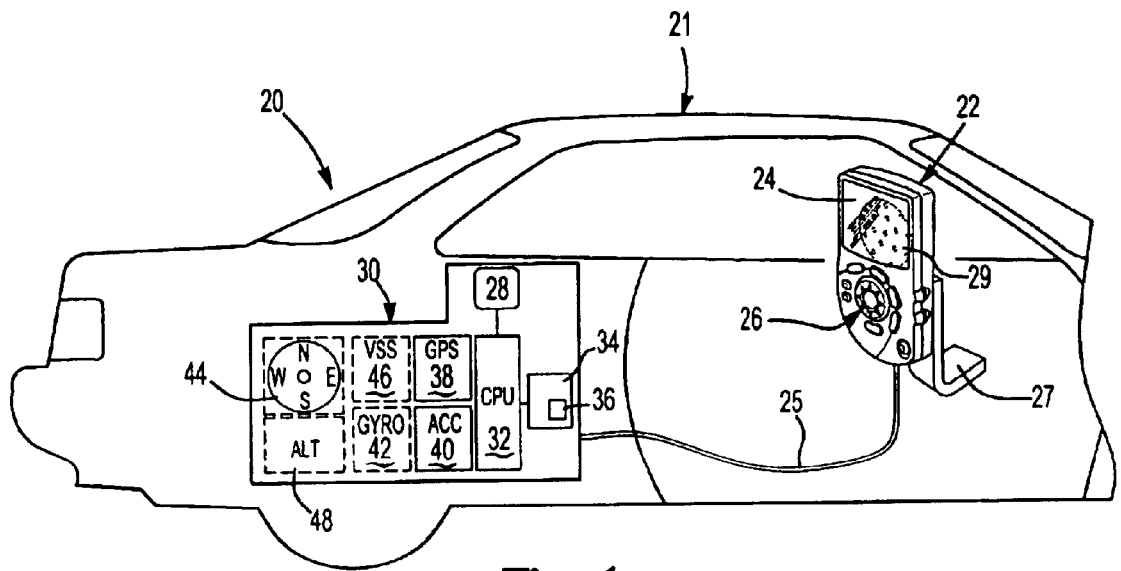
FIG. 1 is a schematic view of the vehicle navigation system of the present invention.

The navigation system 20 of the present invention is shown schematically in FIG. 1. The navigation system 20 includes a unit 30 having a CPU 22 (Central Processing Unit) connected to a display device 24 and a directional input device 26 attached to the vehicle interior by a bracket 27, or the like. The navigation system 20 further includes a database 28 connected to the CPU 22. The database 28 is a mass media storage device, such as a CD-ROM, hard drive, DVD, RAM, ROM or the like which includes a map of the road system in the area to be traveled by the user. Each road in the database is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.). The road segment may be part of the vehicle route or may be a road segment outside the vehicle route.

The navigation system 20 can, but need not, be installed in a vehicle 21. The navigation system can be used in conjunction with position determining devices, such as a GPS receiver 38 and a multi-axis accelerometer 40. Navigation system 20 could alternatively or additionally include a gyroscope 42, a compass 44, and a wheel speed sensor 46, all connected to the CPU 32 (connections not shown for simplicity). Preferably, a combination of these position determining devices is utilized to assure accurate location.

Figure 2:
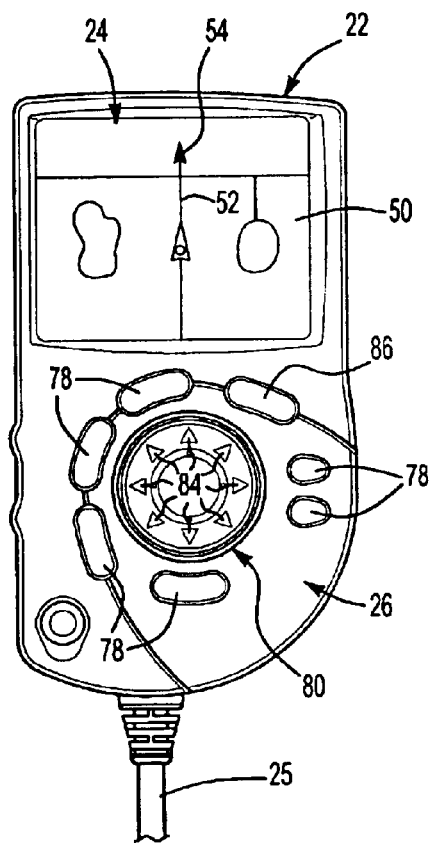
FIG. 2 is a front elevational view of the vehicle navigation system display unit having a video display.

The display device 22 may include a speaker 29. FIG. 2 is a perspective view of one disclosed embodiment of the display device 24 and directional input device 26, preferably designed as an integral unit attached to the CPU by connection 25. The display device 24 includes a video display 50, or screen, such as a high resolution LCD or flat panel display. The directional input device 26 includes a multiple of input buttons 78 including preferably, an eight-way button shown generally at 80 and a selection key 86 such as an "Enter" key. Although an eight-way button is shown, it will be realized that other input devices, such as a joystick, mouse or roller ball can be employed. The eight-way button 80 is capable of moving in the direction of any one of the directional arrows 84. Movement of the button 80 in the direction of one of the directional arrows 84 transmits a directional signal.

In on-road guidance mode, the vehicle route 52 is highlighted in a bright color, such as magenta, and arrows 54 overlay the route for easy identification by the user. On-road guidance mode is typically used when the user selects a particular destination. The navigation system then selects and highlights the route 52 based upon certain user selected parameters, such as shortest distance or shortest time. In on-road mode, the user has selected no particular destination. In this mode more detail may be desired than in on-road guidance mode because the user has not necessarily decided upon a particular route. In off-road mode, the navigation system has determined that the vehicle is no longer on any known road and that the vehicle is traveling off the road. To navigate, the driver may set waypoints that represent a precise location on a map. Waypoints may be linked to one another to form a complex route by which the driver may navigate from one destination to the next. Furthermore, waypoints may be used to represent such locations as telephone polls. This information may be used by utility companies to set a route from a location on-road to the location of the telephone poll off-road. Of course good waypoints may be applied to other such similar applications.

Figure 3:
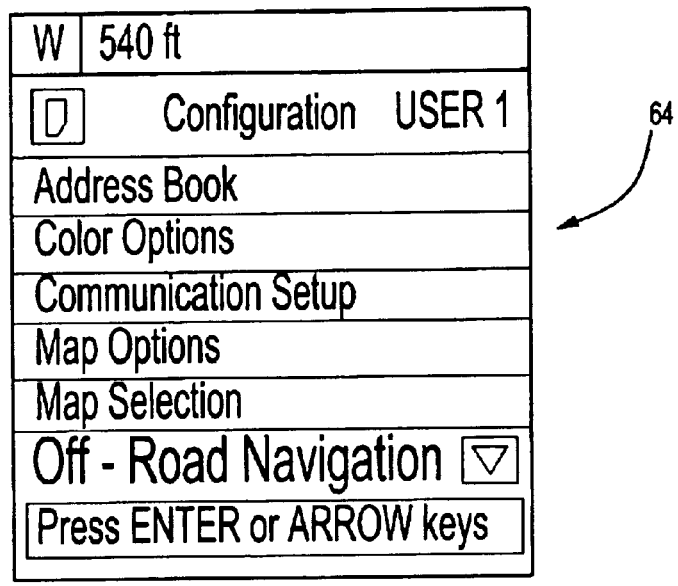
FIG. 3 is a video display of the display unit depicting a configuration options menu.
Figure 4:
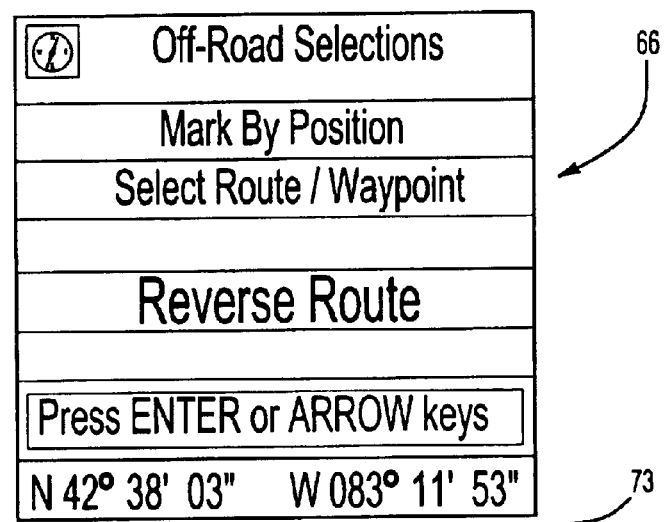
FIG. 4 is a video display of the display unit depicting an off-road selection menu.
Figure 5:
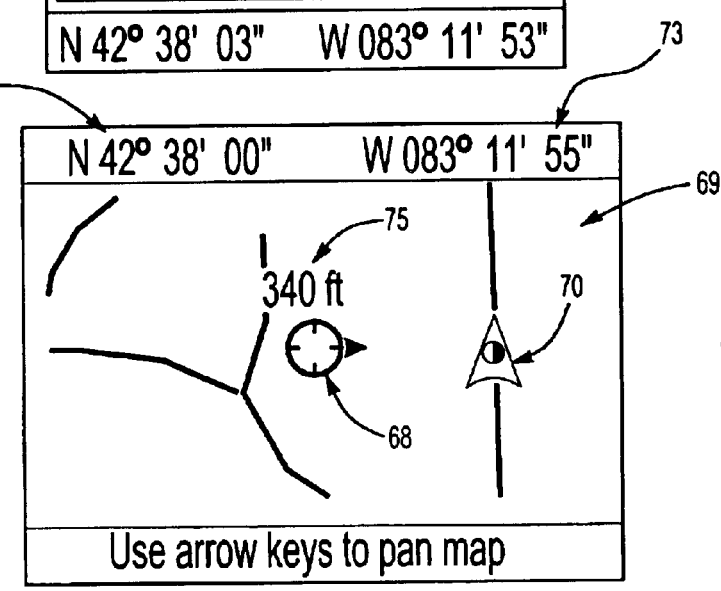
FIG. 5 is a video display of the display unit depicting marking a waypoint by the use of a cursor.

FIG. 3 is a video display of the display unit depicting a configuration options menu 64. From this menu, the user may select an "Off-Road Navigation" menu by which the user may manipulate waypoint and route information. FIG. 4 depicts an off-road selection menu 66 having menu selection options "Mark by Position", "Select Route/Waypoint", "Next Waypoint", and "Reverse Route "Using the "Mark by Position" option, a map location may be saved as a waypoint by utilizing a cursor 68, as shown in FIG. 5. The user may pan, or move, the cursor 68 in a map area 69 to a desired location, which may be other than the present vehicle location (indicated by the vehicle icon 70). The latitude 72 and longitude 73 of the cursor 68 is displayed to the user. The distance of the cursor 68 to the vehicle 70 is indicated above the cursor 68 at 75. The waypoint may be saved be pressing the "Enter" key 86, after which a waypoint entry screen 74, shown in FIG. 6, will be displayed prompting the user to enter information regarding the waypoint. Regardless of the mode of entry of a new waypoint, the user is prompted to enter descriptive information about the waypoint. As seen in FIG. 6, the latitude and longitude of the waypoint is displayed. A default label 77 of "Way001" is displayed unless the user enters a new 6-character alphanumeric description of the waypoint in the label field 77. A default label of "Way002", and so on, would be displayed for subsequent waypoints. The waypoint is represented by an icon in the map area once the waypoint has been saved. One default icon that may be used is a flag 90. The default icon may be changed and selected from a group of icons to more meaningfully correspond the waypoint to the user.

FIG. 7 depicts a map area with first 92 and second 94 waypoints in a map area 69. The waypoints 92 and 94 define a route depicted by path 96, which is a straight line between the waypoints 92 and 94. The direction and distance from the vehicle 70 to the next waypoint, which is first waypoint 92, is indicated at 97 and 98, respectively. The next waypoint, first waypoint 92, is highlighted to stand out to the user. An option "More" 99 may be temporarily displayed to the user, to enable the user to readily manipulation waypoint and route information. As a simplified alternative to the map area 69 shown in FIG. 7, a first directional screen 100 may be used, as shown in FIG. 8. A simple horizon 102 is displayed with a three dimensional directional arrow 104 pointing the direction to next waypoint. The next waypoint, or waypoint to which the vehicle is traveling, is indicated at 103.

The first directional screen 100 may include a lane indicia 106 to further assist the user in navigating to the next waypoint. A pointer 107 pointing at the center 108 of the lane indicia 106 corresponds to the vehicle following the route path. The ends 109 of the lane indicia 106 correspond to a user selected offset from the path. For example, the ends 109 may correspond to an offset of 500 feet from the path. Total time remaining and total remaining distance of the route may also be displayed. As long as the pointer 107 is on center 108, the user is driving the vehicle along the path. As the vehicle wanders from the path, the pointer 107 will move along the lane indicia 106 to provide the user feed back of the degree to which the vehicle has strayed from the path.

Figure 9:
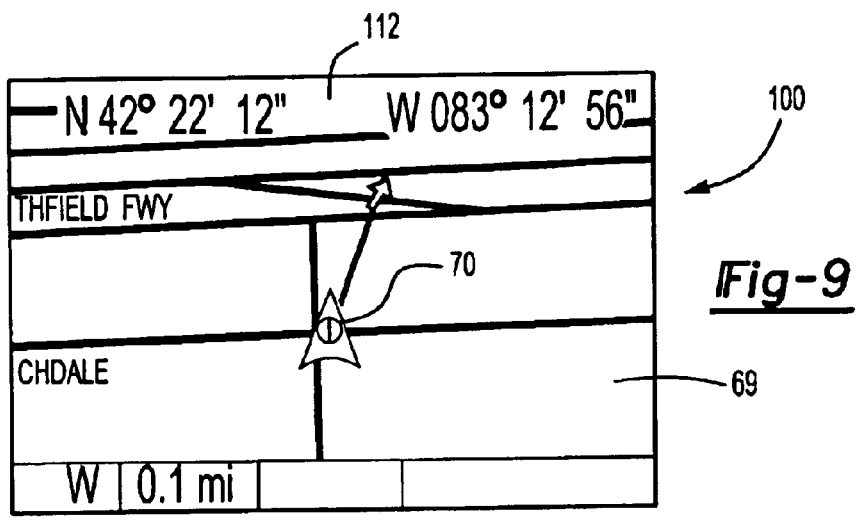
FIG. 9 is a video display of the display unit depicting a second directional screen.
Figure 10:
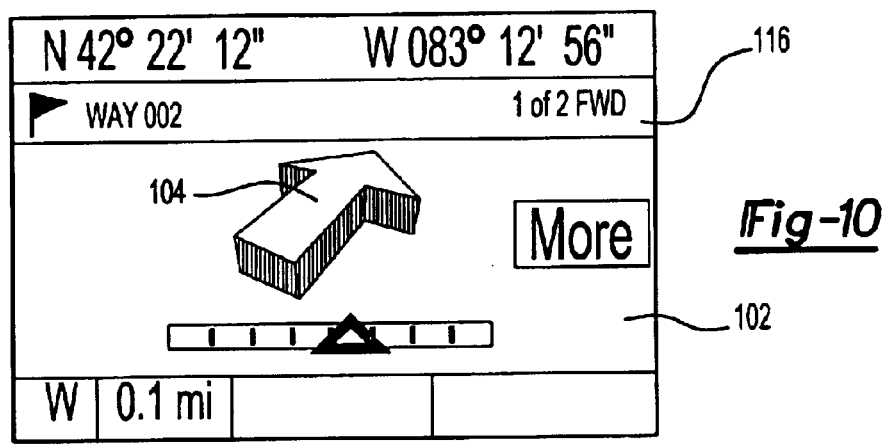
FIG. 10 is a video display of the display unit depicting a third directional screen similar to the first directional screen.
Figure 11:
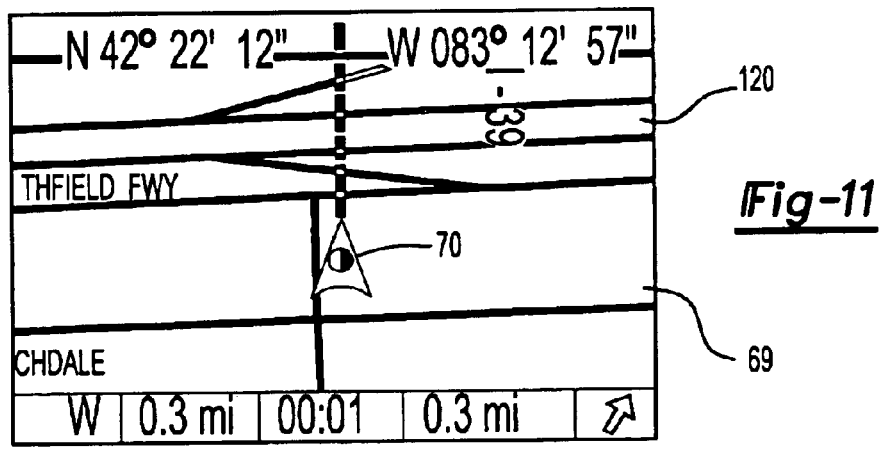
FIG. 11 is a video display of the display unit depicting another second directional screen.

A second direction screen 110 is shown in FIG. 9 in off-road guidance mode. A highlighted path 112 from the vehicle 70 to a waypoint (not shown) is displayed in the map area 69. A two dimensional arrow 114 is overlaid on the path 112. When the user selects a third directional screen 116, shown in FIG. 10, the two dimensional arrow 114 is converted to a three dimensional arrow 118 on the simple horizon similar to the first directional screen 100 shown in FIG. 8. If the vehicle 70 varies from the path 112 when in off-road mode, a new path 120 will be displayed from the present vehicle location to the next waypoint (not shown). The new path 120 may be a highlighted dashed line.

Figure 12:
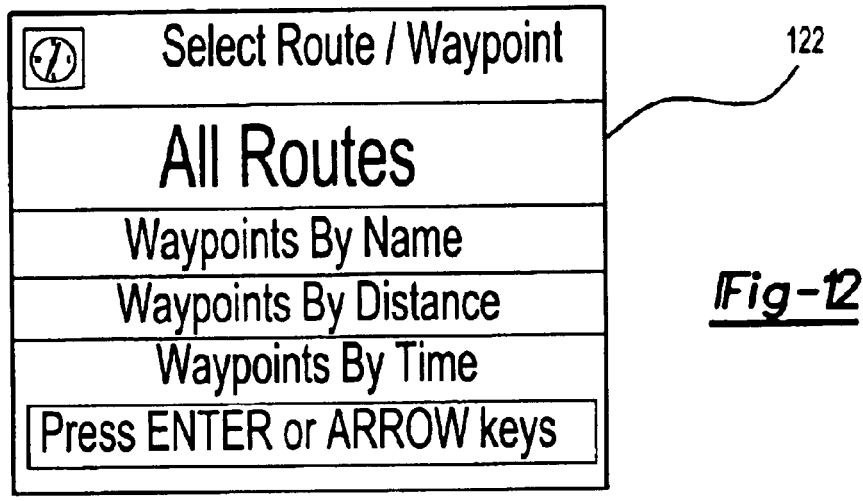
FIG. 12 is a video display of the display unit depicting a waypoint selection menu.

Waypoint and route information may be further manipulated by selecting "Select Route/Waypoints" from the off-road selection menu 66. FIG. 12 depicts a waypoint selection menu 122 having "All Routes", "Waypoints by Name", "Waypoints by Distance", and "Waypoints by Time" options. "All Routes" displays all of the routes alphabetically when selected. Similarly, "Waypoints by Name" displays all of the waypoints alphabetically. "Waypoints by Distance" displays all of the waypoints in order of closest to the present vehicle location to farthest from the present vehicle location. "Waypoints by Time" displays the waypoints in order of time of creation. In this manner, the waypoint and route information may be manipulated quickly in several different ways.

Figure 13:
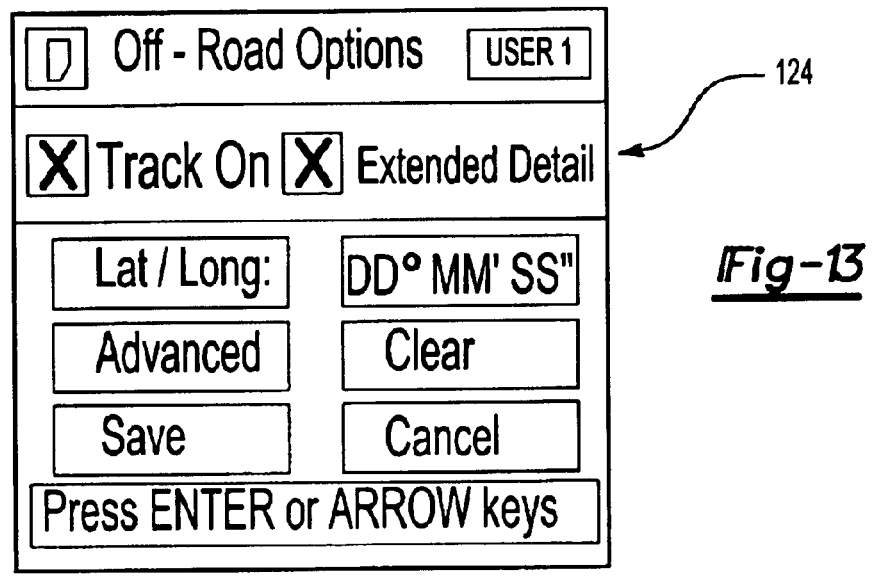
FIG. 13 is a video display of the display unit depicting an off-road options menu.
Figure 14:
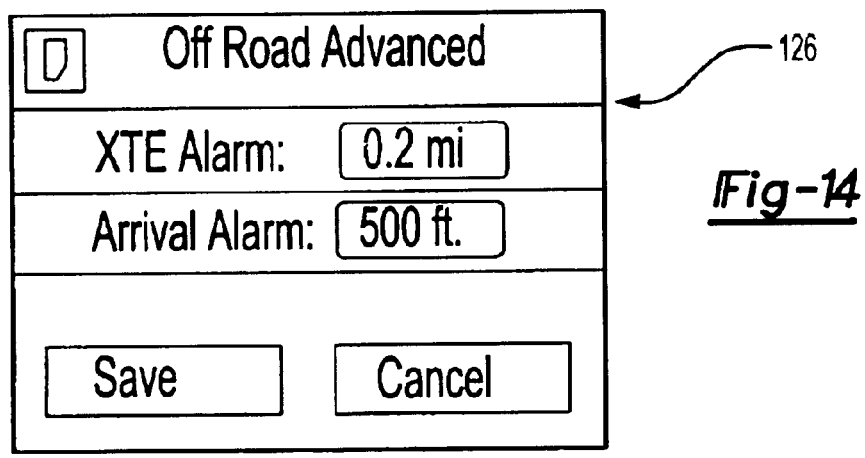
FIG. 14 is a video display of the display unit depicting an advanced off-road options menu.
Figure 15:
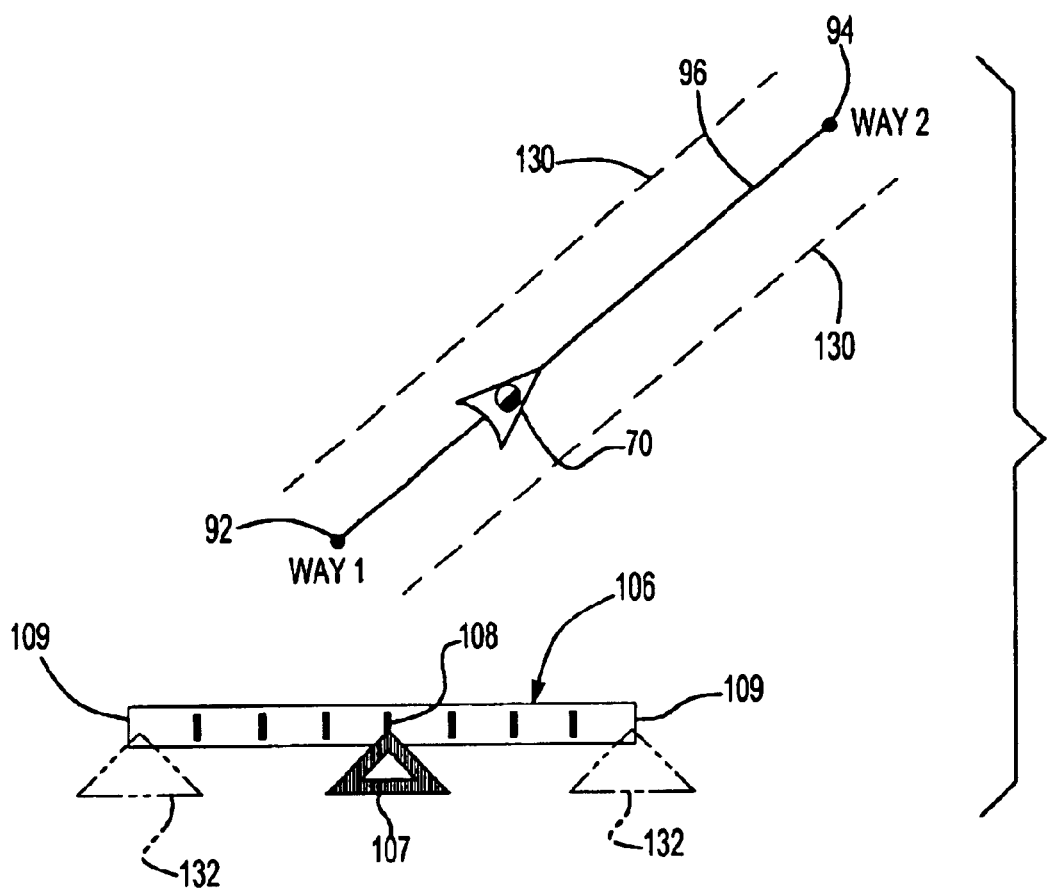
FIG. 15 is a schematic representation of the laterally parallel waypoint proximity option.

More advanced information relating the waypoints and routes may be manipulated using an off-road options menu 124, shown in FIG. 13. Routes and waypoints may be deleted using the "Clear" option. The offset from a path may be set by the user, as described above, using the "Advanced . . . " option under the off-road options menu 124, which will display the advanced off-road options menu 126, shown in FIG. 14. The offset from the path may set by the user by selecting the "XTE Alarm" option. As shown in FIG. 14, the offset is set at 0.2 miles. The offset sets the ends 109 of the lane indicia 106. An audible alarm through speaker 26 may be used when the vehicle reaches one of the offsets from the path. The lane indicia 106 and how it relates with the waypoints 92, 94 and path 96 is graphically illustrated in FIG. 15. Each of the ends 109 correspond to an offset 130, which is shown as dashed lines parallel to the path 96. Preferably, the dashed lines are not displayed, but are only used to illustrate the operation of the offset. When the vehicle 70 reaches one of the offsets 130, the arrow 107 will point at one of the ends 109 corresponding to the side of the offset, shown by dashed arrows 132. An audible alarm may sound, or voice instructions may be activated, indicating to the driver that the vehicle has veered off the path by the selected offset distance.

Figure 16:
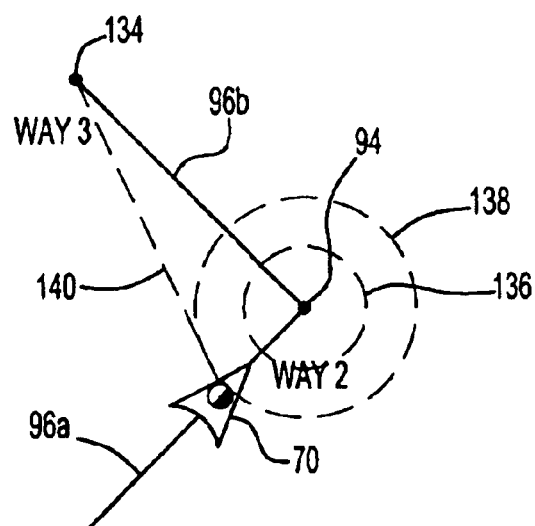
FIG. 16 is a schematic representation of the radial waypoint proximity option.

An waypoint arrival option may also be set using the "Arrival Alarm" option under the advanced off-road menu 126. FIG. 16 is a schematic representation of a radial waypoint proximity option. The radial waypoint proximity option may be used to simplify navigation along the route by directing the user to travel to the next waypoint once the vehicle is sufficiently proximate to the target waypoint. The route contains a path 96a from a first waypoint (not shown) to a second waypoint 94 and a path 96b from the second waypoint 94 to a third waypoint 134. The arrival alarm may be set to any radial distance, such as 250 feet indicated at 136 and 500 feet indicated at 138. Of course metric distances may be used. The dashed lines corresponding to the radial distance preferably is not displayed. If the radial distance is set to 500 feet, when the vehicle 70 reaches the radius 138, the user will be directed to travel to the third waypoint 134 and a new path 140 will be generated. In this manner, the user may more efficiently travel along the route instead of needlessly traveling directing to each waypoint, which may add a significant distance to the distance traveled. An audible alarm, or voice instructions may be activated when the vehicle reaches the radial distance. For example, the voice instructions may direct the vehicle operator to "proceed 30 degrees left".

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of utilizing waypoints for a vehicle comprising:
   a) adding a first waypoint relating to a first vehicle position;
   b) adding a second waypoint relating to a second vehicle position;
   c) saving the waypoints as a route;
   d) manipulating waypoint information relating to the waypoints;
   e) manipulating route information relating to the route;
   f) displaying at least a portion of the route on a display screen; and
   g) indicating a desired direction of vehicle travel from a current vehicle location to one of the waypoints,
   wherein step c) includes saving a path from the first waypoint to the second waypoint, step e) includes providing an offset on either side of the path defining a lane of travel, and step g) includes displaying a pointer on a lane indicia corresponding to the current vehicle location relative to the lane of travel.

2. The method according to claim 1, wherein step g) includes locating the pointer at a center of the lane indicia when the current vehicle location is on the path.

3. The method according to claim 1, wherein step g) includes activating an audible alarm when the current vehicle location reaches the offset.

4. The method according to claim 1, wherein step d) includes providing a radius about the waypoints, and step g) includes displaying a new path of vehicle travel to a next waypoint when the current vehicle location reaches the radius.

5. The method according to claim 4, wherein step g) includes activating an audible alarm wherein the current vehicle location reaches the radius.

6. The method according to claim 1, wherein step d) includes selecting an icon from a group of icons, the icon being associated with one of the waypoint.

7. The method according to claim 1, wherein step e) includes skipping a waypoint and routing to a next waypoint.

8. The method according to claim 1, wherein step e) includes organizing the waypoints from closest to the vehicle to farthest from the vehicle.

9. An apparatus for a navigation system for providing waypoints, the apparatus comprising:
   at least one position determining device for providing a vehicle location signal;
   a database having a map including a waypoint;
   a processor interconnected to said at least one positioning device and said database for determining the location of the vehicle relative to said map;
   a video display connected to said processor for displaying a directional screen;
   a directional indicator indicating a desired direction of vehicle travel from said location of the vehicle to said waypoint, said processor displaying said indicator on said video display,
   wherein a memory having a path from the first waypoint to the second waypoint stored in said memory, said processor providing an offset on either side of said path defining a lane of travel, and said video display displaying a pointer on a lane indicia corresponding to said location of the vehicle relative to said lane of travel.

10. The apparatus according to claim 9, wherein said display device displays said pointer at a center of said lane indicia when said location of the vehicle is on said path.

11. The apparatus according to claim 9, further including a speaker emitting an audible alarm when said location of the vehicle reaches said offset.

12. The apparatus according to claim 9, wherein said display device displays a radius about said waypoints, and said display device displays a new path of vehicle travel to a next waypoint when said location of the vehicle reaches said radius.

13. The apparatus according to claim 12, further including a speaker emitting an audible alarm when said location of the vehicle reaches said radius.

* * * * *